(12) United States Patent
Takemura et al.

(10) Patent No.: US 6,850,682 B2
(45) Date of Patent: Feb. 1, 2005

(54) RESIN COMPOSITION FOR COATING OPTICAL FIBER AND COATED OPTICAL FIBER AND OPTICAL FIBER UNIT USING THE SAME

(75) Inventors: Kiyoshi Takemura, Osaka (JP); Akihiro Iwamoto, Ageo (JP); Osamu Saitou, Ageo (JP)

(73) Assignee: Dainippon Ink and Chemicals, Inc., Tokyo (JP)

( * ) Notice: Subject to any disclaimer, the term of this patent is extended or adjusted under 35 U.S.C. 154(b) by 180 days.

(21) Appl. No.: 10/326,384

(22) Filed: Dec. 23, 2002

(65) Prior Publication Data

US 2003/0138231 A1 Jul. 24, 2003

(30) Foreign Application Priority Data

Dec. 26, 2001 (JP) .......................................... 2001-393340

(51) Int. Cl.[7] .............................. G02B 6/02; G02B 6/22
(52) U.S. Cl. ........................ 385/128; 428/359; 428/364; 427/163.1; 427/163.2
(58) Field of Search ..................... 427/163.1, 163.2, 427/340, 385.5, 400; 428/359, 364; 385/128

(56) References Cited

U.S. PATENT DOCUMENTS

| | | | | |
|---|---|---|---|---|
| 3,903,322 A | | 9/1975 | Ravve et al. .................. | 427/54 |
| 4,207,156 A | | 6/1980 | Collins et al. ............... | 204/159 |
| 4,740,055 A | * | 4/1988 | Kanda et al. ................ | 385/141 |
| 4,882,370 A | * | 11/1989 | Jordan et al. ............... | 523/215 |

FOREIGN PATENT DOCUMENTS

| | | |
|---|---|---|
| JP | 62-215663 | 9/1987 |
| JP | 1-190712 | 7/1989 |
| JP | 2-34620 | 2/1990 |
| JP | 2-64510 | 3/1990 |
| JP | 2-248470 | 10/1990 |
| JP | 3-59017 | 3/1991 |
| JP | 10-29997 | 2/1998 |
| JP | 2001-199748 | 7/2001 |

OTHER PUBLICATIONS

Database CA Online! Chemical Abstracts Service, Database accession No. 111:82983, XP002236571 & JP 62 215663, Sep. 22, 1987.

\* cited by examiner

*Primary Examiner*—Akm Enayet Ullah
*Assistant Examiner*—Daniel Petkovsek
(74) *Attorney, Agent, or Firm*—Armstrong, Kratz, Quintos, Hanson & Brooks, LLP

(57) ABSTRACT

A resin composition for an optical fiber is provided which can be sufficiently cured even in high-speed processing (at a low light energy dose) to obtain a cured article having a Young's modulus suitable for use for an optical fiber, and also causes neither increase in viscosity nor deposition of solids in storage for a long period or in storage at a high temperature and can be easily coated even after such storage. A coated fiber and an optical fiber unit, which use the resin composition are also provided. The composition contains a radical polymerizable compound (A); a photopolymerization initiator (B); a sulfide (C) represented by the formulas: $R_1$—S—$R_1$, $R_2OOCCH_2CH_2$—S—$CH_2CH_2COOR_2$, $(R_3$—$SCH_2CH_2COOCH_2)_4C$, $HOCH_2CH_2S$—$R_4$—$SCH_2CH_2OH$,

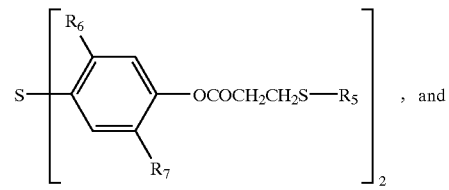 , and $R_8$—$SCH_2CH_2COOR_9$; and an organic amine (D) represented by the formula:

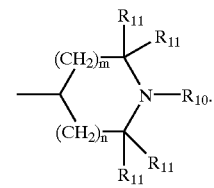

8 Claims, No Drawings

RESIN COMPOSITION FOR COATING OPTICAL FIBER AND COATED OPTICAL FIBER AND OPTICAL FIBER UNIT USING THE SAME

BACKGROUND OF THE INVENTION

1. Field of the Invention

The present invention relates to a resin composition for coating an optical fiber which has excellent rapid curability and excellent storage stability.

2. Description of Related Art

Optical fiber cables have been put to practical use as a high-capacity information transmission medium, with broadband networks utilizing optical fiber cables now being constructed. Optical fibers are roughly classified into those having a double-layered coated structure, comprising a waveguide glass and primary and secondary coating layers made of a radiation (for example, ultraviolet light) curable resin (hereinafter referred to as a resin composition for coating an optical fiber) provided on the waveguide glass, and those having a single-layered coated structure, comprising a waveguide glass and a single coating layer provided on the waveguide glass. Such an optical fiber provided with the coating layer is referred to as a coated optical fiber, which is sometimes provided with a colored layer on the outermost layer for the purpose of identification to give a colored coated optical fiber. Furthermore, the optical fibers may have a unitary structure obtained by arranging plural coated optical fibers or colored coated optical fibers in the form of concentric circles or planes and integrating them using a resin composition for coating an optical fiber. This unitary structure is useful in realizing a high optical fiber density and is now common in optical fiber cables.

Various characteristics such as high-speed processability, or durability and mechanical strength of a film after curing are required of the resin composition for coating an optical fiber to be used as a primary coating material, a secondary coating material and a material for forming an optical fiber unit. Among these characteristics, rapid curability and the storage stability are important as characteristics of the composition before curing. Specifically, required characteristics are as follows.

(1) Rapid Curability

The resin composition shall be sufficiently cured even in high-speed processing (low light energy dose) at a speed equal to or higher than several hundred meters/minute or several thousand meters/minute to obtain a cured article having a Young's modulus suited for use in the optical fiber.

(2) Storage Stability

The resin composition shall cause neither an increase in viscosity nor deposition of solids during storage for a long period or storage at a high temperature and can be used for coating without any problem even after storage under those conditions.

Other characteristics are as follows.

(3) High-Speed Processability

The resin composition shall be uniformly coated on the surface of a coated optical fiber even in high-speed processing.

(4) Durability

The resin composition shall not cause a change in transmission characteristics and mechanical characteristics of an optical fiber unit when exposed to various environments for a long period, and thus exhibits good durability.

(5) Temperature Characteristics

The resin composition shall not cause a change in transmission characteristics and mechanical characteristics of an optical fiber unit even when exposed to a service temperature within a wide range, and thus exhibits good temperature characteristics.

(6) Toughness

The resin composition shall have good balance between Young's modulus, elongation and breaking strength so as not to be damaged even by harsh treatment.

(7) Water Resistance

The resin composition shall not cause deterioration of transmission characteristics for a long period even if a cable sheath is accidentally broken after the optical fiber cable is laid, resulting in permeation of water into the cable.

Among the prior art proposed for the purpose of improving the rapid curability or storage stability, the prior art proposed for the purpose of achieving rapid curability includes Japanese Unexamined Patent Application, First Publication No. Hei 1-190712, Japanese Unexamined Patent Application, First Publication No. Hei 2-248470, Japanese Unexamined Patent Application, First Publication No. Hei 2-34620, and Japanese Unexamined Patent Application, First Publication No. Hei 2-64510. In the resin composition for coating an optical fiber described in these prior art references, however, not only is rapid curability insufficient, but also the storage stability is unsatisfactory. Also Japanese Unexamined Patent Application, First Publication No. Sho 62-215663 discloses a technique relating to a resin composition for coating an optical fiber which is mixed with a sulfur antioxidant for the purpose of achieving satisfactory stability of a coating film over time after curing. Also Japanese Unexamined Patent Application, First Publication No. 2001-199748 describes a technique relating to a resin composition for coating an optical fiber using a radical polymerizable polyurethane compound having a specific structure and also discloses a technique to improve the rapid curability and storage stability. In the techniques described in these patent publications, however, a resin composition has not been obtained for coating an optical fiber capable of sufficiently satisfying the rapid curability and the storage stability of the composition before curing at a technical level required at present.

BRIEF SUMMARY OF THE INVENTION

Thus, an object of the present invention is to provide a resin composition for an optical fiber which can be sufficiently cured even in high-speed processing (low light energy dose) at a speed equal to or higher than several hundred meters/minute or several thousand meters/minute to obtain a cured article having a Young's modulus suited for use in an optical fiber, and also causes neither increase in viscosity nor deposition of solids during storage for a long period or storage at a high temperature and can be coated without any problem even after storage under those conditions.

Another object of the present invention is to provide a coated optical fiber coated with a cured coating film of the resin composition for coating an optical fiber which achieves the above object, and an optical fiber unit.

Under these circumstances, the present inventors have intensively studied to achieve the above objects, and thus completed the following inventions.

The present invention provides a resin composition for coating an optical fiber, comprising a radical polymerizable compound (A), a photopolymerization initiator (B), a sulfide (C) and an organic amine (D), wherein the sulfide (C) is a compound represented by the following formula 1, 2, 3, 4, 5 or 6:

$R_1$—S—$R_1$ (Formula 1)

$R_2OCOCH_2CH_2$—S—$CH_2CH_2COOR_2$ (Formula 2)

$(R_3$—$SCH_2CH_2COOCH_2)_4C$ (Formula 3)

$HOCH_2CH_2S$—$R_4$—$SCH_2CH_2OH$ (Formula 4)

(Formula 5)

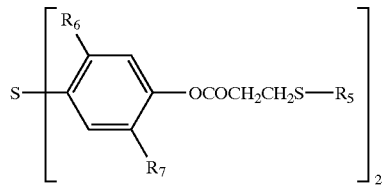

$R_8$—$SCH_2CH_2COOR_9$ (Formula 6)

wherein $R_1$ represents an alkyl group having 1 to 24 carbon atoms, an alkenyl group having 1 to 24 carbon atoms, or a phenyl group which may be substituted with one or more hydroxyl groups or one or more halogen atoms, $R_2$, $R_3$, $R_5$, $R_6$, $R_7$, $R_8$ and $R_9$ represent an alkyl group having 1 to 24 carbon atoms or an alkenyl group having 1 to 24 carbon atoms, and $R_4$ represents an alkylene group having 1 to 24 carbon atoms or an alkenylene group having 1 to 24 carbon atoms, and the organic amine (D) is a hindered amine having a group represented by the following formula 7:

(Formula 7)

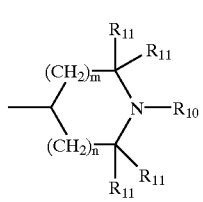

wherein $R_{10}$ represents a hydrogen atom, an alkyl group having 1 to 4 carbon atoms or an alkoxy group having 1 to 12 carbon atoms, $R_{11}$ represents an alkyl group having 1 to 4 carbon atoms, and m and n each independently represents an integer of 0 to 2 and the sum total of m and n is from 1 to 3.

The present inventors have found that the resin composition for coating an optical fiber which contains the sulfide (C) is sufficiently cured even in processing under the conditions of high speed equal to or higher than several hundred meters/minute or several thousand meters/minute, namely, a low light energy dose, to obtain a cured article having the expected Young's modulus. However, only by adding the sulfide it was impossible to overcome such inconvenience as an increase in viscosity caused by the resin composition and deposition of solids during storage for a long period or storage at a high temperature. The present inventors have studied to improve the storage stability by utilizing rapid curability of the sulfide (C) and found a synergistic effect capable of achieving sufficient storage stability and improving rapid curability under the conditions of a low light energy dose by adding the organic amine (D) having a group represented by the formula 7, in addition to the sulfide (C), and thus completed the present invention. The combination of one or more compounds selected from the sulfides (C) represented by the formulas 1 to 6 and the organic amine (D) having a group represented by the formula 7 functions as a rapid curing accelerator of the resin composition for coating an optical fiber.

Rapid curability of the resin composition for coating an optical fiber can be taken as an index by comparing the Young's modulus of the cured article in the case of the low light energy dose to the Young's modulus when irradiated with light energy at a sufficient dose. In the present invention, as the index in the case of studying rapid curability of the resin composition, a ratio of the Young's modulus ($E_L$) in the case of irradiating with light energy in a dose of 0.025 J/cm² using a metal halide lamp to the Young's modulus ($E_H$) in the case of irradiating with light energy in a dose of 0.5 J/cm², (($E_L/E_H$)×100) (%), is used. That is, as the value of (($E_L/E_H$)×100) increases, it becomes possible to achieve the expected Young's modulus in a lower light energy dose. A small value indicates that the composition has not been cured sufficiently yet and thus the expected Young's modulus has not been achieved. Since the resin composition for coating an optical fiber of the present invention has a large value of (($E_L/E_H$)×100), it is possible to obtain a cured article having the expected Young's modulus at a lower light energy dose.

According to the present invention, a resin composition for coating an optical fiber which has excellent rapid curability and excellent storage stability can be obtained. Also, a coated optical fiber and an optical fiber unit can be stably produced under high-speed coating conditions by using the resin composition.

DETAILED DESCRIPTION OF THE INVENTION

The present invention will now be described in detail. The radical polymerizable compound (A) used in the present invention is a compound having a polymerizable unsaturated group such as a vinyl group, acrylic group or methacrylic group at the terminal end and includes a radical polymerizable oligomer (A1) having a relatively high molecular weight and a radical polymerizable oligomer (A2) having a relatively low molecular weight. As the radical polymerizable oligomer (A1), a conventionally known radical polymerizable oligomer can be used, and examples thereof include urethane acrylate synthesized from a polyol (a1), a polyisocyanate (a2) and a compound (a3) having a polymerizable unsaturated group and a hydroxyl group in the same molecule, epoxy resin as a reaction product of a glycidyl ether compound and carboxylic acids having a polymerizable unsaturated group such as (meth)acrylic acid, and vinyl ether. In the present invention, these compounds are preferably used.

Examples of the polyol (a1) include polyester polyol obtained by polycondensation of a polybasic acid and a polyhydric alcohol; polyester polyol obtained by ring-opening polymerization of lactones such as ε-caprolactone and γ-valerolactone; polyether polyol as a polymer of an alkylene oxide such as ethylene oxide, propylene oxide or butylene oxide, or a cyclic ether such as tetrahydrofuran or alkyl-substituted tetrahydrofuran, or a copolymer of two or more polymers; polybutadiene polyol; hydrogenated polybutadiene polyol; and polycarbonate diol.

Examples of the polyisocyanate (a2) include polyisocyanates such as tolylene diisocyanate, 4,4'-diphenylmethane diisocyanate, hydrogenated 4,4'-diphenylmethane diisocyanate, xylylene diisocyanate, hydrogenated xylylene diisocyanate, hexamethylene diisocyanate, isophorone diisocyanate, 1,5-naphthalene diisocyanate, tolidine diisocyanate, p-phenylene diisocyanate, transcyclohexane-1,4-diisocyanate, lysine diisocyanate, tetramethylxylene diisocyanate, lysine ester triisocyanate, 1,6,11-undecane triisocyanate, 1,8-diisocyanate-4-isocyanate methyloctane, 1,3,6-hexamethylene triisocyanate, bicycloheptane triisocyanate, trimethylhexamethylene diisocyanate and norbornene diisocyanate.

Examples of the compound (a3) having a polymerizable unsaturated group and a hydroxyl group in the same molecule include 2-hydroxyethyl (meth)acrylate, 2-hydroxypropyl (meth)acrylate, 2-hydroxy-3-phenoxypropyl (meth)acrylate, 2-(meth)acryloyloxyethyl-2-hydroxyethylphthalic acid, pentaerythritol tri(meth)acrylate, 3-acryloyloxyglycerin mono(meth)acryiate, 2-hydroxybutyl (meth)acrylate, 2-hydroxy-1-(meth)acryloxy-3-(meth)acryloxypropane, glycerin di(meth)acrylate, polypropylene glycol mono(meth)acrylate, polyethylene glycol mono (meth)acrylate, poly-ε-caprolactone mono(meth)acrylate, 4-hydroxybutyl (meth)acrylate and ε-caprolactone mono (meth)acrylate.

As the compound (a3), an isocyanuric acid derivative having a polymerizable unsaturated group and a hydroxyl group in the same molecule is also useful. As the isocyanuric acid derivative, for example, commonly used ones are those obtained by adding lactones such as γ-butyrolactone, γ-valerolactone, δ-valerolactone, ε-caprolactone, D-glucono-1,4-lactone, 1,10-phenanthrenecarbolactone, 4-penten-5-olide and 12-dodecanolide, an alkylene oxide such as ethylene oxide or propylene oxide, or cyclic ether such as tetrahydrofuran, to isocyanuric acid and reacting the reaction product with a carboxyl compound having a polymerizable unsaturated group, such as (meth)acrylic acid or (meth)acrylate ester, in an equivalent ratio that enables the resulting hydroxyl groups to remain in an amount of 1 mol or more by means of a dehydration condensation or transesterification reaction.

The epoxy acrylate is preferably a reaction product of a glycidyl ether of a polyol having an aromatic ring, for example, bisphenols such as bisphenol A, bisphenol S and bisphenol F and a phenol resin, and (meth)acrylic acid.

Among these, a radical polymerizable oligomer having a polyether polyol as a skeleton is preferred because of its good rapid curability and good high-speed processability. Also urethane acrylate using epoxy acrylate as the polyol is preferred.

As the radical polymerizable monomer (A2) in the present invention, conventionally known ones can be used, including, for example, a compound having such a structure that (meth)acrylic acid is bonded to a compound having a hydroxyl group by means of the transesterification reaction. Specific examples thereof include radical polymerizable monomers such as methoxyethylene glycol (meth)acrylate, methoxypolyethylene glycol (meth)acrylate, nonylphenoxyethyl (meth)acrylate, nonylphenoxypolyethylene (meth)acrylate, phenoxyethyl (meth)acrylate, phenoxypolyethylene glycol (meth)acrylate, methoxypolyethylene glycol (meth)acrylate, β-(meth)acryloyloxypropylhydrogen succinate, butoxypolyethylene glycol (meth)acrylate, alkyl (meth)acrylate, tetrahydrofurfuryl (meth)acrylate, isobornyl (meth)acrylate, benzyl (meth)acrylate, 2-hydroxyethyl (meth)acrylate, 2-hydroxypropyl (meth)acrylate, 2-hydroxy-3-phenoxypropyl (meth)acrylate, 2-(meth)acryloyloxyethyl-2-hydroxyethylphthalic acid, 3-acryloyloxyglycerin mono(meth)acrylate, 2-hydroxybutyl (meth)acrylate, 2-hydroxy-1-(meth)acryloxy-3-(meth)acryloxypropane, polypropylene glycol mono(meth)acrylate, polyethylene glycol mono(meth)acrylate, poly-ε-caprolactone mono(meth)acrylate, dialkylaminoethyl (meth)acrylate, glycidyl (meth)acrylate, trifluoroethyl (meth)acrylate, 2,2,3,4,4,4-hexafluorobutyl (meth)acrylate, dicyclopentenyloxyalkyl (meth)acrylate, dicyclopentanyl (meth)acrylate, tricyclodecanyl (meth)acrylate, tricyclodecanyloxyethyl (meth)acrylate, isobornyloxyethyl (meth)acrylate, N-vinyl pyrrolidone, 2-vinylpyridine, 4-vinylpyridine, morpholine (meth)acrylate and N-vinyl caprolactam.

Also, there are listed difunctional radical polymerizable monomers such as di(meth)acrylate of 2,2-dimethyl-3-hydroxypropyl-2,2-dimethyl-3-hydroxypropionate, ethylene glycol di(meth)acrylate, polypropylene glycol di(meth)acrylate, 1,6-hexanediol di(meth)acrylate, glycerin di(meth)acrylate, neopentyl glycol di(meth)acrylate, di(meth)acrylate of hydroxypivalic acid neopentyl glycol, di(meth)acrylate of bisphenol A ethylene oxide adduct, di(meth)acrylate of bisphenol A propylene oxide adduct, 2,2'-di(hydroxypropoxyphenyl)propane di(meth)acrylate, tricyclodecanedimethylol di(meth)acrylate, di(meth)acrylate of bisphenol F ethylene oxide adduct, di(meth)acrylate of bisphenol F propylene oxide adduct, 3,9-bis(1,1-dimethyl-2-hydroxyethyl)-2,4,8,10-tetraoxaspiro[5,5]undecane diacrylate and 5-ethyl-2-(2-hydroxy-1,1-dimethylethyl)-5-(hydroxymethyl)-1,3-dioxane diacrylate.

Furthermore, there may be listed polyfunctional radical polymerizable monomers such as trimethylolpropane tri(meth)acrylate, pentaerythritol tri(meth)acrylate, pentaerythritol tetra(meth)acrylate, dipentaerythritol hexa(meth)acrylate, tetramethylolmethane tri(meth)acrylate, tetramethylolmethane tetra(meth)acrylate, tri(meth)acrylate of trimethylolpropane ethylene oxide adduct, tri(meth)acrylate of pentaerythritol ethylene oxide adduct, tetra(meth)acrylate of pentaerythritol ethylene oxide adduct, hexa(meth)acrylate of dipentaerythritol ethylene oxide adduct, tri(meth)acrylate of tetramethylolmethane ethylene oxide adduct, tetra(meth)acrylate of tetramethylolmethane ethylene oxide adduct, tri(meth)acrylate of tris(2-hydroxyethyl) isocyanurate, tri(meth)acrylate of trimellitic acid, triallyltrimellitic acid and triallyl isocyanurate.

Among these, di(meth)acrylate of ethylene oxide adduct of bisphenol A, di(meth)acrylate of propylene oxide adduct of bisphenol A, di(meth)acrylate of ethylene oxide adduct of bisphenol F, di(meth)acrylate of propylene oxide adduct of bisphenol F, diacrylate of 3,9-bis(1,1-dimethyl-2-hydroxyethyl)-2,4,8,10-tetraoxaspiro[5,5]undecane and diacrylate of 5-ethyl-2-(2-hydroxy-1,1-dimethylethyl)-5-(hydroxymethyl)-1,3-dioxane are preferred, and those having two or more cyclic structures, which are connected directly or connected through a carbon atom, such as di(meth)acrylate of ethylene oxide adduct of bisphenol A and di(meth)acrylate of propylene oxide adduct of bisphenol A having a molecular weight of 200 to 800, are particularly preferred because of their excellent water resistance, excellent rapid curability and excellent high-speed processability.

Similarly, compounds wherein a cyclic structure and/or an amide bond and a polymerizable unsaturated group are bonded through 0 to 4 atoms, for example, dicyclopentanyl (meth)acrylate, tricyclodecanyl (meth)acrylate, bornyl (meth)acrylate, isobornyl (meth)acrylate, N-vinyl-2-pyrrolidone, 2-vinylpyridine, 4-vinylpyridine, morpholine (meth)acrylate, N-vinylcaprolactam, vinylcarbazole, N-vinylformamide and N-vinylacetamide are preferred because of their excellent high-speed processability and excellent rapid curability.

The radical polymerizable compound (A) is preferably used in the amount within a range from 80 to 99% by weight based on the entire optical fiber resin composition. When the amount is within the above range, the resulting composition has good rapid curability.

As the photopolymerization initiator (B) in the present invention, a publicly known photopolymerization initiator can be used and examples thereof include:

(B1) alkoxyacetophenone, benzyl dimethyl ketal, benzophenone and benzophenone derivative, alkyl benzoylbenzoate, benzyl and benzyl derivative, benzoin and benzoin derivative, benzoin alkyl ether, 2-hydroxy-2-methylpropiophenone, 1-hydroxycyclohexyl phenyl ketone or 2,2-dimethoxy-1,2-diphenylethan-1-one;

(B2) a photopolymerization initiator having a sulfur atom in the molecule, such as thioxanthone or thioxanthone derivative;

(B3) a photopolymerization initiator having a sulfur atom and a nitrogen atom in the molecule, such as 2-methyl-1-[4-(methylthio)phenyl]-2-morpholinopropanone-1;

(B4) a photopolymerization initiator having a nitrogen atom in the molecule, such as (B4-1) 2-benzyl-2-dimethylamino-1-(4-morpholinophenyl)-butanone-1, (B4-2) 3,6-bis(2-methyl-2-morpholinopropionyl)-9-n-octylcarbazole, or (B4-3) bis(4-dialkylaminophenyl)ketone, 4-dimethylaminobenzoic acid, 4-dimethylaminobenzoate ester;

(B5) a photopolymerization initiator having a phosphorus atom in the molecule, such as (B5-1) 2,4,6-trimethylbenzoyldiphenylphosphine oxide, (B5-2) 2,4,6-trimethylbenzoylethoxyphenylphosphine oxide, (B5-3) bis(2,6-dimethoxybenzoyl)-2,4,4-trimethylpentylphosphine oxide, or (B5-4) bis(2,4,6-trimethylbenzoyl)-phenylphosphine oxide.

As the photopolymerization initiator in the present invention, one, two or more photopolymerization initiators selected from the group consisting of photopolymerization initiator having a phosphorus atom in the molecule, photopolymerization initiator having a nitrogen atom in the molecule and photopolymerization initiator having a sulfur atom in the molecule, among the above compounds, are preferably used. Specifically, the compounds (B2), (B3), (B4-1), (B4-2), and (B5) are more preferred among the above compounds.

Among photopolymerization initiators which do not contain a phosphorus atom, a nitrogen atom or a sulfur atom in the molecule, 1-hydroxycyclohexyl phenyl ketone and 2,2-dimethoxy-1,2-diphenylethan-1-one are photopolymerization initiators which are preferably used in the present invention.

Two or more photopolymerization initiators listed above are preferably used in combination. Thereby, rapid curability is improved.

The photopolymerization initiator (B) is preferably used in the amount within a range from 0.001 to 15% by weight, and more preferably from 0.5 to 8% by weight, based on the entire optical fiber resin composition. Thereby, rapid curability is improved.

The sulfide (C) used in the resin composition for coating an optical fiber of the present invention is a compound represented by any of the above formulas 1 to 6 and is a compound not including groups in the molecule which adversely affect rapid curability, such as a hindered phenol structure, polysulfide structure or thiol group (—SH). Compounds having any structure can be used as long as they are compounds represented by the above formulas 1 to 6. Among these compounds, sulfides which are liquid at normal temperature are preferred because the sulfides do not cause deposition of solids and exhibit excellent rapid curability. The polysulfide structure refers to a structure represented by the formula: —($S_n$)— wherein n represents an integer of 2 or more.

The sulfides (C) which can be used in the present invention may be any publicly known compounds as long as they are compounds represented by the above formulas 1 to 6, and examples thereof include the following compounds: diethyl sulfide, diphenyl sulfide, dilauryl-3,3'-thiodipropionate, dimyristyl-3,3'-thiodipropionate, distearyl-3,3'-thiodipropionate, dibehenyl-3,3'-thiodipropionate, pentaerythritoltetrakis(3-lauryl thiopropionate), ditridecyl-3,3'-thiodipropionate, bis(2-ethylhexyl)3,3'-thiodipropionate, methylthiopropionic acid ethyl ester, 1,2-bis(2-hydroxyethylthio)ethane, 1,4-bis(2-hydroxyethylthio)butane, 2-hydroxythioanisole and bis[2-methyl-4-(3-n-alkylthiopropionyloxy)-5-t-butylphenyl] sulfide.

Among these compounds, a compound having an alkyl group having 4 or more carbon atoms and an alkylene group is preferred because of its high rapid curability.

Among these compounds, distearyl-3,3'-thiodipropionate, bis(2-ethylhexyl)3,3'-thiodipropionate, bis[2-methyl-4-(3-n-alkylthiopropionyloxy)-5-t-butylphenyl] sulfide and pentaerythritoltetrakis(3-lauryl thiopropionate) are more preferred. Particularly, bis(2-ethylhexyl)3,3'-thiodipropionate is preferred because of its good rapid curability.

The sulfide (C) is preferably used in an amount within a range from 0.1% to 10% by weight based on the entire optical fiber resin composition. The sulfide is more preferably used in an amount within a range from 0.5% to 5% by weight because the resulting composition has good rapid curability.

It is particularly preferred that the amount be within a range from 0.5% to 2% by weight.

The organic amines (D) which can be used in the present invention are hindered amines having a group represented by the formula 7. Compounds having any structure can be used as long as they are hindered amines having a group represented by the formula 7 and examples thereof include the following: bis(1,2,2,6,6-pentamethyl-4-piperidyl)sebacate, bis(2,2,6,6-tetramethyl-4-piperidyl)sebacate, 2-(3,5-di-t-butyl-4-hydroxybenzyl)-2-n-butyl malonic acid bis(1,2,2,6,6-pentamethyl-4-piperidyl), dimethyl succinate-1-(2-hydroxylethyl)-4-hydroxy-2,2,6,6-tetramethylpiperidine polycondensate, poly[1,6-(1,1,3,3-tetramethylbutyl)imino-1,3,5-triazin-2,4-diyl], [(2,2,6,6-tetramethyl-4-piperidyl)imino]hexamethylene[(2,2,6,6-tetramethyl-4-piperidyl)imino]], 1-[2-[3-(3,5-di-t-butyl-4-hydroxyphenyl)propionyloxylethyl]-4-[3-(3,5-di-t-butyl-4-hydroxyphenyl)propionyloxy]-2,2,6,6-tetramethylpiperidine, (mixed 1,2,2,6,6-pentamethyl-4-piperidyl/tridecyl)-1,2,3,4-butanetetracarboxylate, tetrakis(2,2,6,6-tetramethyl-4-piperidyl)-1,2,3,4-butanetetracarboxylate and bis(1-octyloxy-2,2,6,6-tetramethyl-4-piperidyl)sebacate.

Among these organic amines (D), those which are liquid at normal temperature are preferred because of their good storage stability. Among these, a compound of the formula 7 in which $R_{10}$ is an alkyl group or an alkoxy group is more preferred and a compound in which $R_{10}$ is an alkyl group is particularly preferred.

Among these compounds, bis(1,2,2,6,6-pentamethyl-4-piperidyl)sebacate or bis(2,2,6,6-tetramethyl-4-piperidyl)sebacate is more preferably used.

The organic amine (D) is preferably used in an amount within a range from 0.01 to 2% by weight, and more preferably from 0.05 to 1% by weight, based on the entire optical fiber resin composition because the resulting composition has higher rapid curability and sufficient storage stability.

If necessary, in addition to the above components, other amines, polymerization inhibitors such as amines, hydroquinone, and p-methoxyphenol, decolorizers such as phosphite ester, defoamers such as silicone oil, releasants, leveling agents, and pigments may be added to the resin composition for coating an optical fiber of the present invention.

The resin composition for coating an optical fiber of the present invention can be prepared by mixing the above respective components by a conventional method. Also, a coated optical fiber coated with a cured coating film of the resin composition for coating an optical fiber of the present invention, or an optical fiber unit comprising plural coated optical fibers coated with the cured coating film, which are bundled with each other, can be produced by coating the resin composition for coating an optical fiber onto a waveguide glass, a primary-coated waveguide glass or a coated optical fiber using a conventional method and irradiating the resin composition with ultraviolet light using a high pressure mercury vapor lamp or a metal halide lamp, thereby curing the resin composition.

Furthermore, the resin composition for coating an optical fiber of the present invention exhibits superior suitability for use as a material for forming an optical fiber unit in which plural coated optical fibers are bundled because of excellent rapid curability and excellent storage stability. Therefore, the resin composition for coating an optical fiber of the present invention is best suited for use as a resin composition to produce an optical fiber unit. When using the resin composition for coating an optical fiber of the present invention as the material for forming an optical fiber unit, the optical fiber unit is produced by bundling plural coated optical fibers, applying the resin composition on the bundle using a conventional method and irradiating the resin composition with ultraviolet light using a high pressure mercury vapor lamp or a metal halide lamp, thereby curing the resin composition.

EXAMPLES

The following Examples further illustrate the present invention in detail. However, the present invention is not limited to these Examples. In the Examples, all parts are by weight.

Synthesis Example 1

Synthesis of Urethane Acrylate (OS-1))

In a flask equipped with a stirring blade, 348 parts (2 mol) of TDI (2,4-tolylene diisocyanate) was charged and 2000 parts (1 mol) of polypropylene glycol (number-average molecular weight of 2000) and 2 parts of dibutyltin diacetate were added while stirring. After heating to 70° C. while paying attention to heat generation, 0.2 parts of p-methoxyphenol and 1 part of 2,6-tertiary butyl-4-methylphenol were added. The reaction was conducted at the same temperature for 7 hours. Then, 232 parts (2 mol) of HEA (2-hydroxyethyl acrylate) was charged and the reaction was further reacted at the same temperature for 7 hours. After confirming the disappearance of absorption of NCO by infrared absorption spectrum, the reaction product was taken out to obtain a urethane acrylate (OS-1) as a radical polymerizable oligomer (A1).

Synthesis Example 2

Synthesis of Urethane Acrylate (OS-2))

In a flask equipped with a stirring blade, 348 parts (2 mol) of TDI (2,4-tolylene diisocyanate) was charged and 2000 parts (1 mol) of polytetramethylene glycol (number-average molecular weight of 2000) and dibutyltin diacetate were added while stirring. After heating to 70° C. while paying attention to heat generation, 0.2 parts of p-methoxyphenol and 1 part of 2,6-tertiary butyl-4-methylphenol were added. The reaction was conducted at the same temperature for 7 hours. Then, 232 parts (2 mol) of HEA (2-hydroxyethyl acrylate) was charged and the reaction was further reacted at the same temperature for 7 hours. After confirming the disappearance of absorption of NCO by infrared absorption spectrum, the reaction product was taken out to obtain a urethane acrylate (OS-2) as a radical polymerizable oligomer (A1).

Synthesis Example 3

Synthesis of Urethane Scrylate (H-1))

In a flask equipped with a stirring blade, 260 parts (2 mol) of 2-hydroxypropyl acrylate(molecular weight of 130) was charged and 174 parts (1 mol) of TDI (2,4-tolylene diisocyanate) was added dropwise. After heating to 70° C. while paying attention to heat generation, the reaction was conducted at the same temperature for 7 hours. After confirming the disappearance of absorption of NCO by infrared absorption spectrum, the reaction product was taken out to obtain a urethane acrylate (H-1) as a radical polymerizable oligomer (A1).

Synthesis Example 4

Synthesis of Urethane Acrylate (H-2))

In a flask equipped with a stirrer, a thermometer and a reflux condenser, 222 parts of isophorone diisocyanate was charged. After heating to 70° C. while stirring, 116 parts of hydroxyethyl acrylate was added dropwise over one hour and reacted to obtain an intermediate. Then, in a flask equipped with a stirrer, a thermometer and a reflux condenser, 144 parts of acrylic acid was added to 376 parts of a bisphenol A epoxy resin (epoxy equivalent: 118 g/eq) and the reaction was conducted at 100° C. for 8 hours. To the reaction product, 338 parts of the above intermediate was added and the reaction was conducted at 80° C. for 5 hours to obtain a urethane acrylate (H-2) as a radical polymerizable oligomer (A1).

Synthesis Example 5

Synthesis of Urethane Acrylate (OS-3))

In a flask equipped with a stirrer, a thermometer and a reflux condenser, 2000 g (1.0 mol) of polypropylene glycol having a number-average molecular weight of 2000 and 348 g (2.0 mol) of 2,4-tolylene diisocyanate were charged and, after heating while stirring, the mixture was maintained at 60° C. After 30 minutes had passed since the temperature reached 60° C., 0.14 g of dibutyltin laurate (in polyurethane, 50 ppm) was added and the reaction was conducted at 60° C. for 2 hours. Then, 0.28 g of t-butylhydroquinone (in polyurethane, 100 ppm), 119 g (1.03 mol) of 2-hydroxyethyl acrylate and 306 g (1.03 mol) of pentaerythritol triacrylate were charged and 0.14 g of dibutyltin laurate (in polyurethane, 50 ppm) was added. After the reaction was conducted at 70° C. for one hour, 693 g of a diluent (M-1) was added and the reaction was further conducted for 8 hours to obtain, as a synthetic product 6, a mixture of a urethane acrylate (OS-3) and a urethane acrylate (M-1) in a ratio of 40/10, which has an average molecular weight of 2,800.

(Preparation of Resin Composition)

Using the radical polymerizable oligomer (A1) synthesized in the above Synthesis Examples and the following compounds, resin compositions were prepared in accordance with the formulations shown in Table 1 and Table 2. In the tables, numerical values in the column of the composition denote the number of parts.

Radical Polymerizable Monomer (A2)
M-1: isobornyl acrylate
M-2: N-vinyl pyrrolidone
M-3: N-vinylcaprolactam
M-4: diacrylate of ethylene oxide adduct (4 mol) of bisphenol A
M-5: diacrylate of tricyciodecanedimethylol Photopolymerization Initiator (B)
I-1: 2,4,6-trimethylbenzoyldiphenylphosphine oxide
I-2: 1-hydroxycyclohexylphenylketone
I-3: 2,2-dimethoxy-1,2-diphenylethan-1-one
I-4: 2-benzyl-2-dimethylamino-1-(4-morpholinophenyl)-butanone-1

Sulfide (C)
S-1: distearyl-3,3'-thiodipropionate
S-2: bis(2-ethylhexyl)3,3'-thiodipropionate
S-3: bis[2-methyl-4-(3-n-alkylthiopropionyloxy)-5-t-butylphenyl]sulfide
(Number of carbon atoms of the n-alkyl group=12 to 14)
S-4: pentaerythritoltetrakis(3-laurylthio propionate)

Other Sulfur Compound (C2)
S-5: thiodiethylene bis[3-(3,5-di-tert-butyl-4-hydroxyphenyl) propionate]
S-6: bis(2-ethylhexyl)3,3'-dithiodi propionate
S-7: 2-ethylhexyl thioglycolate Organic Amine (D)
N-1: bis(2,2,6,6-tetramethyl-4-piperidyl)sebacate
N-2: bis(1,2,2,6,6-pentamethyl-4-piperidyl)sebacate Others (Additives)
Modified silicone: polyether (ethylene oxide/propylene oxide)-modified polydimethylsiloxane (Evaluation of Rapid Curability)

Each of the resin compositions prepared in accordance with the formulations shown in Table 1 was applied on an acrylic plate of a thickness of 150 μm and then cured in a nitrogen atmosphere by irradiating at a dose of 0.5 J/cm$^2$ and 0.025 J/cm$^2$ using a metal halide lamp. The Young's modulus of each curing film was measured under the conditions of a testing speed of 1 mm/min, a temperature of 23° C. and a humidity of 50%RH according to JIS K 7127. A ratio of the Young's modulus measured after irradiating at a dose of 0.025 J/cm$^2$ to the Young's modulus measured after irradiating at a dose of 0.5 J/cm$^2$ was calculated. The resin composition having a ratio of not less than 86% was rated "⊚", the resin composition having a ratio of not less than 83% and less than 86% was rated "○", the resin composition having a ratio of not less than 83% and less than 80% was rated "Δ", and the resin composition having a ratio of less than 80% was rated "X". The results are shown in Table 1 and Table 2.

In the tables, $E_L$ is the Young's modulus (MPa) in the case of irradiating with light energy at a dose 0.025 J/cm$^2$, while $E_H$ is the Young's modulus (MPa) in the case of irradiating with light energy at a dose 0.5 J/cm$^2$. The rapid curability was evaluated based on the value determined by the formula (($E_L/E_H$)×100) (%). The light energy dose of 0.025 J/cm$^2$ corresponds to a speed of 1800 m/min in the manufacturing line of the optical fiber.

The same operation as described above was conducted, except that the thickness of the resin composition was changed to 40 μm, the Young's modulus after irradiating with light energy at a dose of 0.025 J/cm$^2$ and 0.5 J/cm$^2$ was measured and the rapid curability was evaluated. The results are shown in Table 3.

(Evaluation of Storage Stability)

The resin compositions shown in Table 1 and Table 2 were heated to 70° C. and maintained for 24 hours. The resin composition having a viscosity at 25° C. increased by 2 or more times as compared with the viscosity before heating was rated "X", while the resin composition having the same viscosity as that before heating was rated "○". The results are shown in Table 1 and Table 2.

TABLE 1

| | Composition | | Example 1 | Example 2 | Example 3 | Example 4 | Example 5 | Comparative Example 1 | Comparative Example 2 | Comparative Example 3 |
|---|---|---|---|---|---|---|---|---|---|---|
| A | A1 | OS-1 | 30 | | 30 | 40 | 30 | | 30 | 30 |
| | | OS-2 | | 30 | | | | 60 | | |
| | | H-1 | 25 | 20 | 25 | 20 | 25 | | 25 | 25 |
| | | H-2 | | | | 20 | | | | |
| | A2 | M-1 | 5 | 5 | | 12 | 5 | 10 | 5 | 5 |
| | | M-2 | | 10 | | 12 | 10 | 10 | | |
| | | M-3 | 15 | | 15 | | | | 15 | 15 |
| | | M-4 | 30 | 30 | 30 | | 30 | | 30 | 30 |
| | | M-5 | | | | | | 20 | | |
| B | | I-1 | 1 | 2 | 1 | 1 | | 0.5 | 1 | 1 |
| | | I-2 | 3 | | | | 3 | | 3 | 3 |
| | | I-3 | | | 3 | 3 | 3 | 0.5 | | |
| | | I-4 | | 0.5 | | | | | | |
| C | | S-1 | 1 | | | 2 | | | 2 | |
| | | S-2 | | | 2 | | 2 | | | |
| | | S-3 | | 2 | | | | | | |
| D | | N-1 | 0.1 | | 0.5 | | | | | |
| | | N-2 | | 0.5 | | 1 | 0.1 | | | 0.5 |
| Modified silicone | | | 0.1 | 0.1 | 0.1 | 0.1 | 0.1 | | 0.1 | |
| Characteristics | Young's modulus | $E_L$ | 710 | 780 | 670 | 820 | 680 | 360 | 660 | 730 |
| | (MPa) | $E_h$ | 810 | 900 | 780 | 970 | 780 | 480 | 800 | 900 |
| | Rapid curability | | ⊚ | ⊚ | ⊚ | ○ | ⊚ | X | Δ | X |
| | ($E_L/E_H$) × 100(%) | | 88 | 87 | 86 | 85 | 87 | 75 | 82 | 79 |
| | Storage stability | | ○ | ○ | ○ | ○ | ○ | X | X | ○ |

TABLE 2

| | Composition | | Example 6 | Example 7 | Comparative Example 4 | Comparative Example 5 | Comparative Example 6 | Comparative Example 7 | Comparative Example 8 |
|---|---|---|---|---|---|---|---|---|---|
| A | A1 | OS-1 | 30 | | 30 | 30 | 30 | | |
| | | OS-2 | | | | | | | 30 |
| | | H-1 | 25 | | 25 | 25 | 25 | | 20 |
| | | H-2 | | 26 | | | | 26 | |
| | | OS-3 | | 40 | | | | 40 | |
| | A2 | M-1 | 5 | | 5 | 5 | 5 | | 5 |
| | | M-2 | | | | | | | 10 |
| | | M-3 | 15 | 16 | 15 | 15 | 15 | 16 | |
| | | M-4 | 30 | | 30 | 30 | 30 | | 30 |
| | | M-5 | | 18 | | | | 18 | |
| B | | I-1 | 1 | 1 | 1 | 1 | 1 | 1 | 2 |
| | | I-2 | 3 | 3 | 3 | 3 | 3 | 3 | |
| | | I-3 | | | | | | | |
| | | I-4 | | | | | | | 0.5 |
| C | | S-1 | | | | | | | |
| | | S-2 | | 2 | | | | | |
| | | S-3 | | | | | | | |
| | | S-4 | 2 | | | | | | |
| C2 | | S-5 | | | 2 | | | | |
| | | S-6 | | | | | 2 | | |
| | | S-7 | | | | | | 2 | |
| D | | N-1 | | | | | | | |
| | | N-2 | 0.1 | 0.5 | 0.1 | 0.1 | 0.1 | | 0.5 |
| Modified silicone | | | 0.1 | | | | | | 0.1 |
| Characteristics | Young's modulus | $E_L$ | 760 | 530 | 630 | 490 | 300 | 570 | 790 |
| | (MPa) | $E_H$ | 900 | 640 | 800 | 650 | 500 | 730 | 1010 |
| | Rapid curability | | ◎ | ◎ | X | X | X | X | X |
| | $(E_L/E_H) \times 100(\%)$ | | 84 | 83 | 79 | 75 | 60 | 78 | 78 |
| | Storage stability | | ○ | ○ | ○ | ○ | ○ | X | ○ |

TABLE 3

| | | Example 1 | Example 2 | Example 3 | Example 4 | Example 5 | Example 6 | Example 7 | — |
|---|---|---|---|---|---|---|---|---|---|
| Young's modulus | $E_L$ | 580 | 640 | 550 | 670 | 560 | 620 | 420 | — |
| (MPa) | $E_H$ | 660 | 740 | 640 | 790 | 640 | 740 | 500 | — |
| Rapid curability | | ◎ | ◎ | ◎ | ○ | ◎ | ○ | ○ | — |
| $(E_L/E_H) \times 100(\%)$ | | 88 | 86 | 86 | 85 | 88 | 84 | 84 | — |
| | | Comparative Example 1 | Comparative Example 2 | Comparative Example 3 | Comparative Example 4 | Comparative Example 5 | Comparative Example 6 | Comparative Example 7 | Comparative Example 8 |
| Young's modulus | $E_L$ | 340 | 540 | 590 | 510 | 450 | 290 | 450 | 640 |
| (MPa) | $E_H$ | 450 | 650 | 750 | 650 | 600 | 480 | 580 | 830 |
| Rapid curability | | X | Δ | X | X | X | X | X | X |
| $(E_L/E_H) \times 100(\%)$ | | 76 | 83 | 79 | 78 | 75 | 60 | 78 | 77 |

What is claimed is:

1. A resin composition for coating an optical fiber, comprising a radical polymerizable compound (A), a photopolymerization initiator (B), a sulfide (C) and an organic amine (D), wherein the sulfide (C) is a compound represented by the following formula 1, 2, 3, 4, 5 or 6:

$$R_1—S—R_1 \quad \text{(Formula 1)}$$

$$R_2OCOCH_2CH_2—S—CH_2CH_2COOR_2 \quad \text{(Formula 2)}$$

$$(R_3—SCH_2CH_2COOCH_2)_4C \quad \text{(Formula 3)}$$

$$HOCH_2CH_2S—R_4—SCH_2CH_2OH \quad \text{(Formula 4)}$$

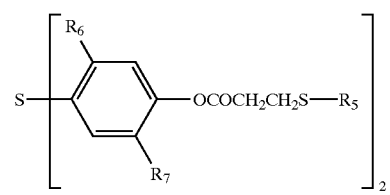

(Formula 5)

$$R_8—SCH_2CH_2COOR_9 \quad \text{(Formula 6)}$$

wherein $R_1$ represents an alkyl group having 1 to 24 carbon atoms, an alkenyl group having 1 to 24 carbon atoms, or a phenyl group which may be substituted with one or more hydroxyl groups or one or more halogen atoms, $R_2$, $R_3$, $R_5$, $R_6$, $R_7$, $R_8$ and $R_9$ represent an alkyl group having 1 to 24 carbon atoms or an alkenyl group having 1 to 24 carbon atoms, and $R_4$ represents an alkylene group having 1 to 24 carbon atoms or an alkenylene group having 1 to 24 carbon atoms, and the organic amine (D) is a hindered amine having a group represented by the following formula 7:

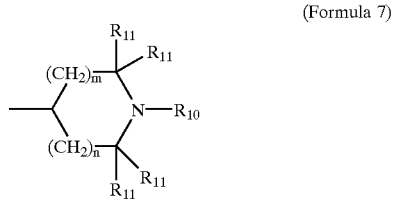

(Formula 7)

wherein $R_{10}$ represents a hydrogen atom, an alkyl group having 1 to 4 carbon atoms or an alkoxy group having 1 to 12 carbon atoms, $R_{11}$ represents an alkyl group having 1 to 4 carbon atoms, and m and n each independently represents an integer of 0 to 2 and the sum total of m and n is from 1 to 3.

2. The resin composition for coating an optical fiber according to claim 1, wherein the sulfide (C) is one or more compounds selected from diethyl sulfide, diphenyl sulfide, dilauryl-3,3'-thiodipropionate, dimyristyl-3,3'-thiodipropionate, distearyl-3,3'-thiodipropionate, dibehenyl-3,3'-thiodipropionate, pentaerythryltetrakis(3-laurylthiopropionate), ditridecyl-3,3'-thiodipropionate, bis(2-ethylhexyl)3,3'-thiodipropionate, methyl thiopropionic acid ethyl ester, 1,2-bis(2-hydroxyethylthio)ethane, 1,4-bis(2-hydroxyethylthio)butane, 2-hydroxythioanisole and bis[2-methyl-4-(3-n-alkylthiopropionyloxy)-5-t-butylphenyl]sulfide.

3. The resin composition for coating an optical fiber according to claim 1, wherein the sulfide (C) is one or more compounds selected from distearyl-3,3'-thiodipropionate, bis(2-ethylhexyl)3,3'-thiodipropionate, bis[2-methyl-4-(3-n-alkylthiopropionyloxy)-5-t-butylphenyl]sulfide and pentaerythritoltetrakis(3-lauryl thiopropionate).

4. The resin composition for coating an optical fiber according to claim 1, wherein the photopolymerization initiator (B) contains one or more photopolymerization initiators selected from a photopolymerization initiator having a phosphorus atom in the molecule, a photopolymerization initiator having a nitrogen atom in the molecule, and a photopolymerization initiator having a sulfur atom in the molecule.

5. The resin composition for coating an optical fiber according to claim 1, wherein the photopolymerization initiator (B) contains 2,2-dimethoxy-1,2-diphenylethan-1-one and/or 1-hydroxycyclohexyl phenyl ketone.

6. A coated optical fiber coated with a cured coating film of the resin composition for coating an optical fiber of any one of claims 1, 2, 3, 4 and 5.

7. An optical fiber unit using the coated optical fiber of claim 6.

8. An optical fiber unit coated with a cured coating film of the resin composition for coating an optical fiber of any one of claims 1, 2, 3, 4 and 5.

* * * * *